United States Patent
Johnson et al.

(12)

(10) Patent No.: US 12,022,767 B2
(45) Date of Patent: Jul. 2, 2024

(54) MOUNTING ASSEMBLY FOR AN AGRICULTURAL PRODUCT METER

(71) Applicant: CNH Industrial America LLC, New Holland, PA (US)

(72) Inventors: Chad Michael Johnson, Arlington Heights, IL (US); Grant Thomas Macdonald, Hampshire, IL (US); Brian John Anderson, Yorkville, IL (US); Mayur Kishorchandra Joshi, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 903 days.

(21) Appl. No.: 17/096,179

(22) Filed: Nov. 12, 2020

(65) Prior Publication Data

US 2022/0142041 A1    May 12, 2022

(51) Int. Cl.
*A01C 7/20* (2006.01)
*A01C 7/04* (2006.01)

(52) U.S. Cl.
CPC ............. *A01C 7/201* (2013.01); *A01C 7/04* (2013.01)

(58) Field of Classification Search
CPC ..... A01C 23/007; A01C 23/008; A01C 7/123; A01C 7/201; A01C 7/04
See application file for complete search history.

(56) References Cited

U.S. PATENT DOCUMENTS

| | | | | |
|---|---|---|---|---|
| 5,263,810 A | * | 11/1993 | Takekata | E02F 3/3672 403/322.3 |
| 5,546,683 A | * | 8/1996 | Clark | E02F 3/3631 37/468 |
| 8,746,159 B2 | | 6/2014 | Garner et al. | |
| 9,360,121 B2 | | 6/2016 | Garner et al. | |
| 9,366,297 B2 | | 6/2016 | Hause | |
| 9,420,739 B2 | | 8/2016 | Rollenhagen | |
| 10,104,830 B2 | | 10/2018 | Heathcote | |
| 10,512,210 B2 | | 12/2019 | Levy et al. | |
| 2009/0277143 A1 | * | 11/2009 | Wolff | A01D 43/063 56/14.7 |
| 2009/0304486 A1 | * | 12/2009 | Bricker | E02F 3/3631 37/468 |
| 2015/0139716 A1 | * | 5/2015 | Schmidt | E02F 3/3686 403/72 |
| 2019/0364718 A1 | | 12/2019 | Garner et al. | |

(Continued)

*Primary Examiner* — Jamie L McGowan
(74) *Attorney, Agent, or Firm* — Rebecca Henkel; Peter K. Zacharias; Rickard K. DeMille

(57) ABSTRACT

A mounting assembly for an agricultural product meter includes an upper mount configured to support at least a portion of a weight of the agricultural product meter. The upper mount is configured to couple to a support structure. The mounting assembly also includes a pin configured to engage the agricultural product meter via movement of the pin along a longitudinal axis of the pin. In addition, the mounting assembly includes a lower mount configured to selectively receive the pin via movement of the pin along the longitudinal axis of the pin. The lower mount is configured to couple to the support structure, and the pin is configured to block movement of the agricultural product meter away from the support structure while the pin is engaged with the agricultural product meter and the lower mount.

18 Claims, 7 Drawing Sheets

(56) References Cited

U.S. PATENT DOCUMENTS

| | | |
|---|---|---|
| 2019/0364719 A1 | 12/2019 | Garner et al. |
| 2019/0364720 A1* | 12/2019 | Garner .................. A01C 7/128 |
| 2019/0364721 A1* | 12/2019 | Garner .................. A01C 7/201 |
| 2019/0364723 A1 | 12/2019 | Garner et al. |
| 2020/0000016 A1* | 1/2020 | Hubner .................. A01C 7/082 |
| 2021/0025144 A1* | 1/2021 | Lehmann .............. E02F 3/3609 |
| 2021/0298236 A1* | 9/2021 | Rothrock ............... A01D 43/14 |
| 2022/0287223 A1* | 9/2022 | Johnson .................. A01C 7/20 |

\* cited by examiner

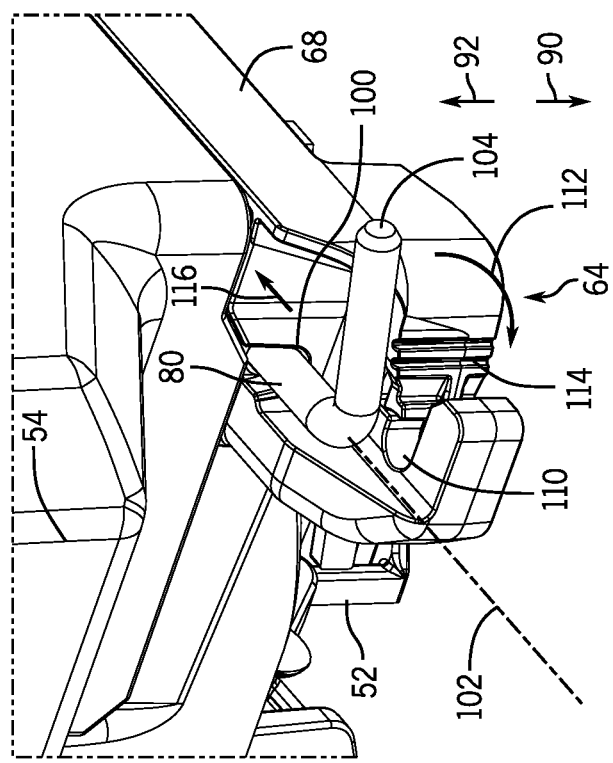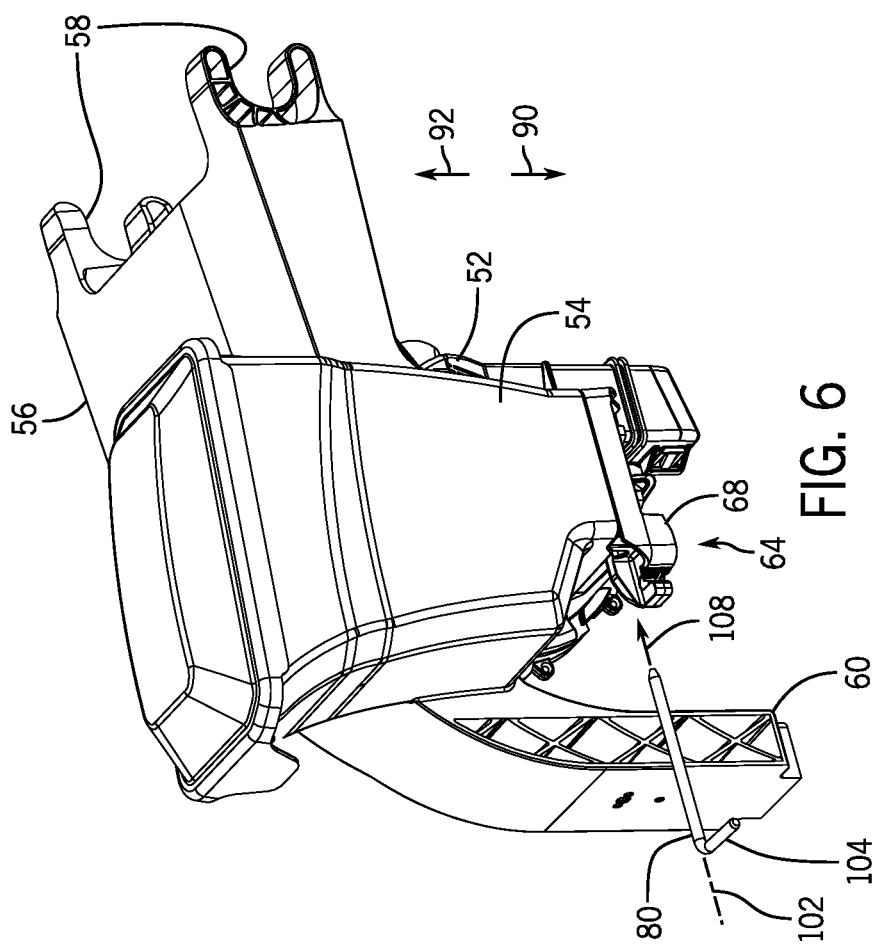

MOUNTING ASSEMBLY FOR AN AGRICULTURAL PRODUCT METER

BACKGROUND

The present disclosure relates generally to a mounting assembly for an agricultural product meter.

Generally, planting implements (e.g., planters) are towed behind a tractor or other work vehicle via a mounting bracket secured to a rigid frame of the implement. Planting implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. An agricultural product conveying system (e.g., seed tube or powered agricultural product conveyor) is configured to deposit seeds and/or other agricultural products (e.g., fertilizer) into the trench. The opener/agricultural product conveying system is followed by closing discs that move displaced soil back into the trench and/or a packer wheel that packs the soil on top of the deposited seeds/other agricultural products.

Each row unit of the planting implement may include an agricultural product meter (e.g., vacuum agricultural product meter, etc.) configured to control a flow rate of the agricultural product (e.g., seed/other agricultural product) to the agricultural product conveying system, thereby establishing a desired distribution of the agricultural product throughout the field. In certain row unit configurations, the agricultural product meter is coupled to a storage compartment (e.g., hopper, mini-hopper, etc.) configured to store the agricultural product, and the storage compartment/agricultural product meter assembly is coupled to a frame of the row unit. The agricultural product meter may be coupled to the storage compartment by engaging a hook at a bottom portion with the agricultural product meter with a rod of the storage compartment. Once the hook is engaged with the rod, the agricultural product meter may be rotated toward the storage compartment such that an extension of the agricultural product meter engages opposing spring clips coupled to the storage compartment, thereby coupling the agricultural product meter to the storage compartment.

In certain configurations, the opposing spring clips include a lower clip that deflects in response to contact with the extension of the agricultural product meter, thereby enabling the extension to engage the lower clip. In addition, the lower clip urges the agricultural product meter upwardly, thereby reducing movement of the agricultural product meter relative to the storage compartment during operation of the planting implement. As a result, the lower clip is precisely formed to enable deflection in response to contact with the agricultural product meter extension and to urge the agricultural product meter upwardly. Precisely forming the lower clip substantially increases the cost of the row unit. In addition, if the planting implement experiences a high g-force event (e.g., due to a wheel of the planting implement engaging a recess within a road while the planting implement is being transported), the lower clip may significantly deflect, thereby enabling the agricultural product meter to move (e.g., rotate) relative to the storage compartment, which may cause the agricultural product meter to be misaligned with the storage compartment.

BRIEF DESCRIPTION

In certain embodiments, a mounting assembly for an agricultural product meter includes an upper mount configured to support at least a portion of a weight of the agricultural product meter. The upper mount is configured to couple to a support structure. The mounting assembly also includes a pin configured to engage the agricultural product meter via movement of the pin along a longitudinal axis of the pin. In addition, the mounting assembly includes a lower mount configured to selectively receive the pin via movement of the pin along the longitudinal axis of the pin. The lower mount is configured to couple to the support structure, and the pin is configured to block movement of the agricultural product meter away from the support structure while the pin is engaged with the agricultural product meter and the lower mount.

DRAWINGS

These and other features, aspects, and advantages of the present disclosure will become better understood when the following detailed description is read with reference to the accompanying drawings in which like characters represent like parts throughout the drawings, wherein:

FIG. 6 is a perspective view of the agricultural product meter, the storage compartment, and the mounting assembly of FIG. 3, in which the agricultural product meter is partially coupled to the storage compartment via the mounting assembly;

Figure 3:
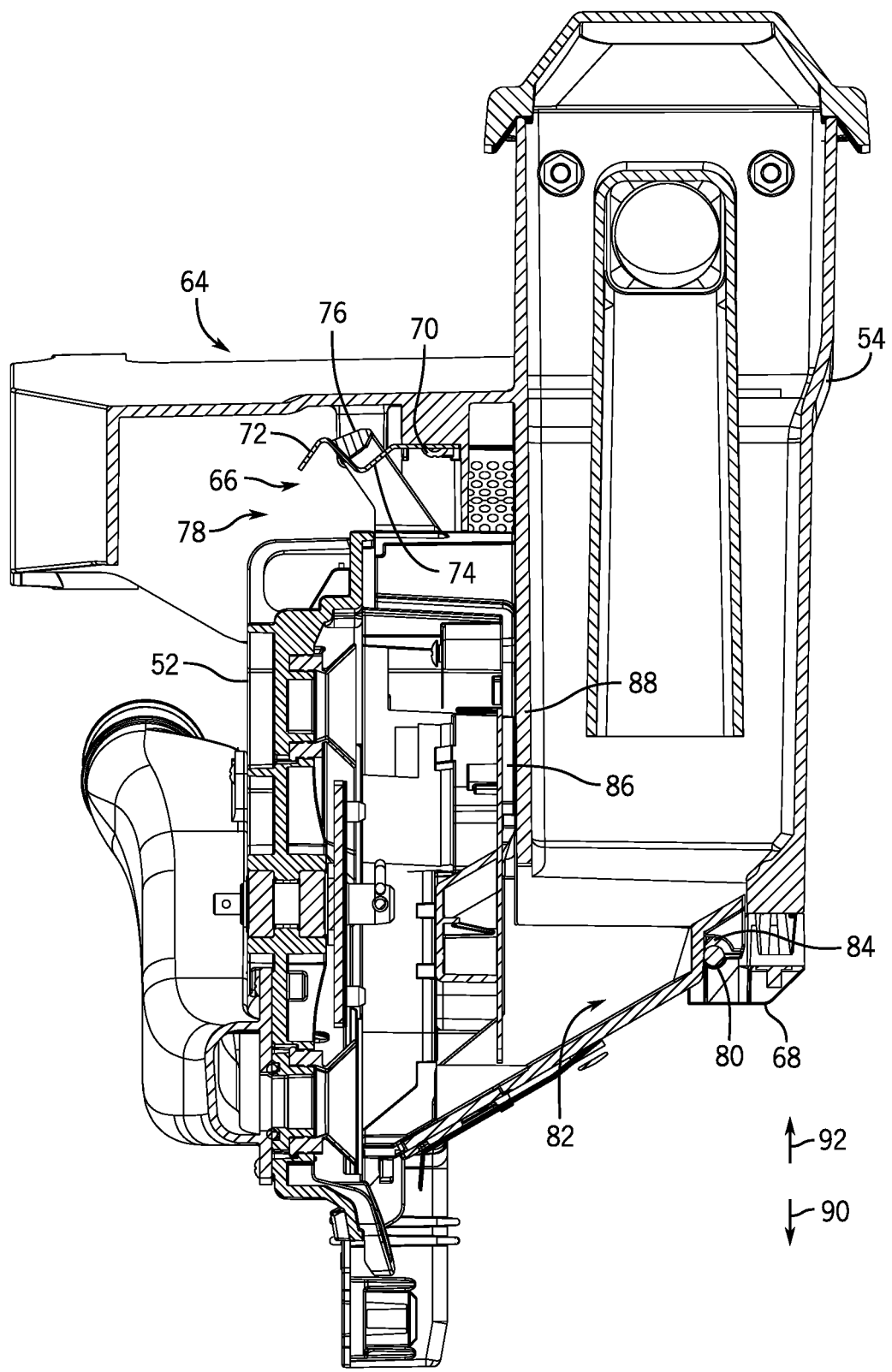
FIG. 3 is a cross-sectional view of an agricultural product meter and a storage compartment of the row unit of FIG. 2, taken along line 3-3 of FIG. 2, in which the agricultural product meter is coupled to the storage compartment via an embodiment of a mounting assembly.
Figure 8:
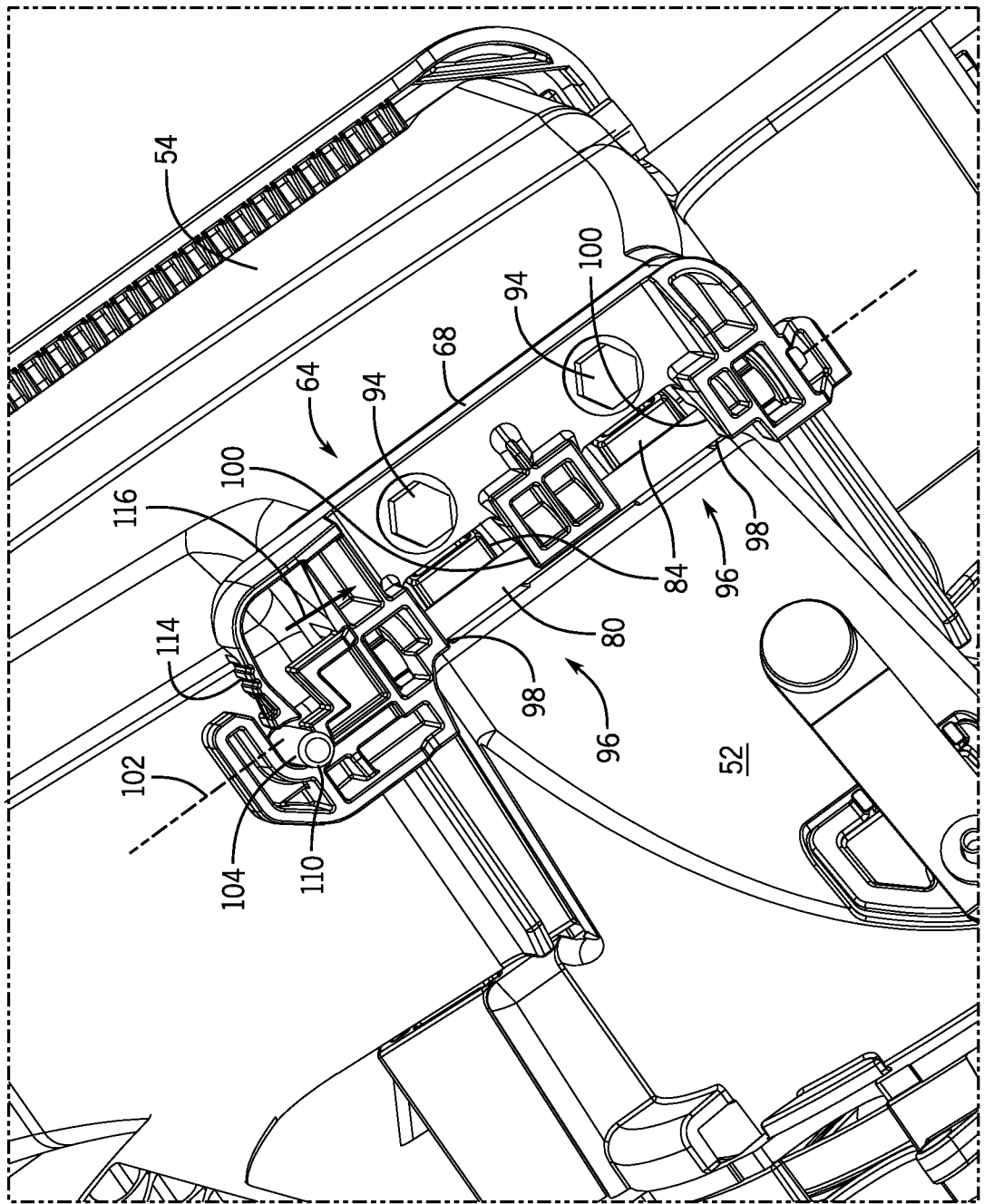

FIG. 7 is a perspective view of a portion of the agricultural product meter, a portion of the storage compartment, and a portion of the mounting assembly of FIG. 3, in which a pin of the mounting assembly is in an unlocked position; and FIG. 8 is a perspective view of a portion of the agricultural product meter, a portion of the storage compartment, and a portion of the mounting assembly of FIG. 3, in which the pin is in a locked position.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
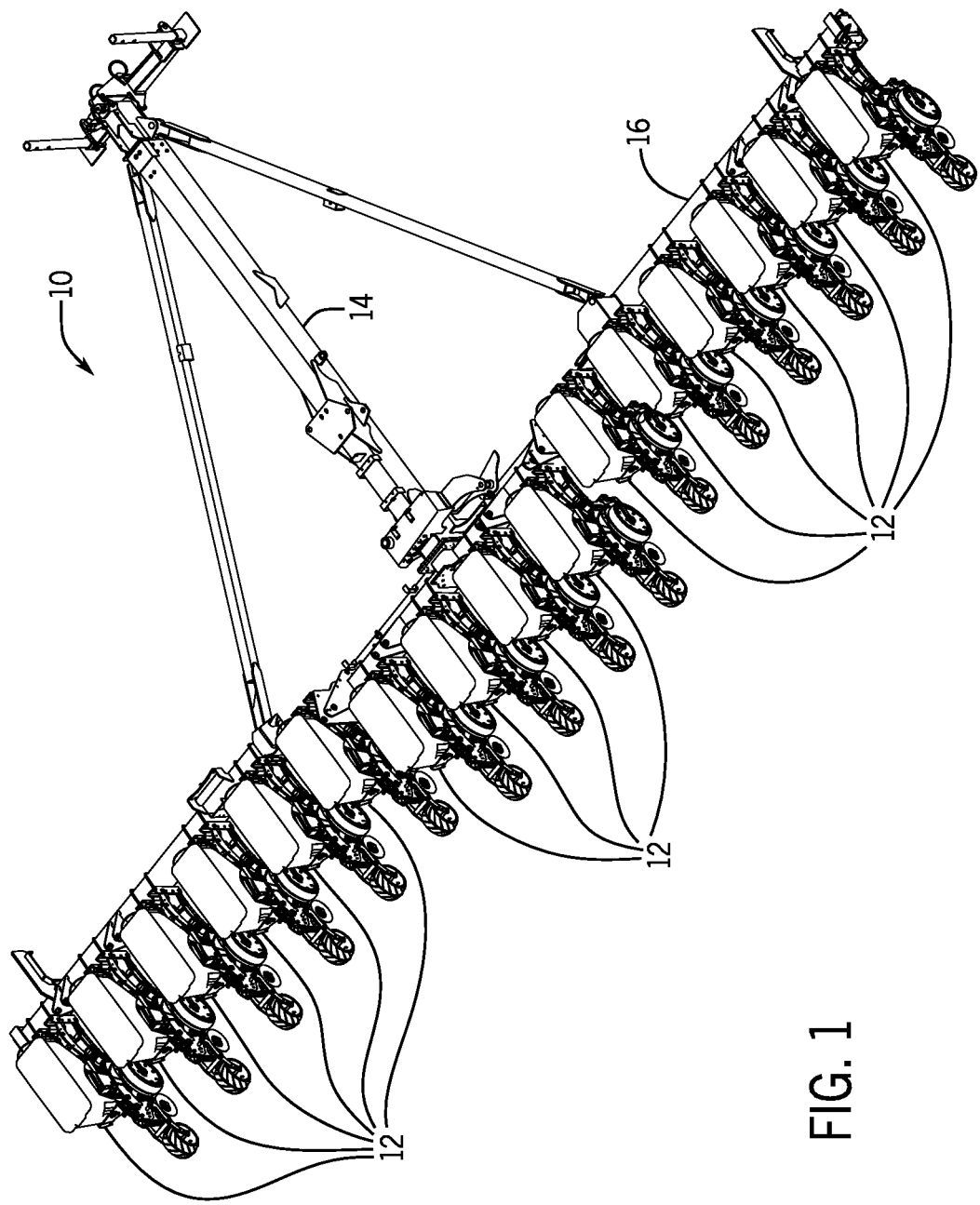
FIG. 1 is a perspective view of an embodiment of an agricultural implement having multiple row units distributed across a width of the agricultural implement.

FIG. 1 is a perspective view of an embodiment of an agricultural implement 10 (e.g., planting implement) having multiple row units 12 distributed across a width of the agricultural implement 10. The implement 10 is configured to be towed through a field behind a work vehicle, such as a tractor. As illustrated, the implement 10 includes a tongue assembly 14, which includes a hitch configured to couple the implement 10 to an appropriate tractor hitch (e.g., via a ball, clevis, or other coupling). The tongue assembly 14 is coupled to a tool bar 16 which supports multiple row units 12. Each row unit 12 may include one or more opener discs configured to form a seed path (e.g., trench) within soil of a field. The row unit 12 may also include an agricultural product conveying system (e.g., seed tube or powered agricultural product conveyer) configured to deposit seeds and/or other agricultural product(s) (e.g., fertilizer) into the seed path/trench. In addition, the row unit 12 may include closing disc(s) and/or a packer wheel positioned behind the agricultural product conveying system. The closing disc(s) are configured to move displaced soil back into the seed path/trench, and the packer wheel is configured to pack soil on top of the deposited seeds/other agricultural product(s).

As discussed in detail below, each row unit 12 of the agricultural implement 10 includes an agricultural product meter (e.g., vacuum agricultural product meter) and a storage compartment (e.g., hopper, mini-hopper, etc.). In certain embodiments, the storage compartment (e.g., hopper) stores a sufficient amount of agricultural product to complete a desired planting operation. Furthermore, in certain embodiments, the storage compartment (e.g., mini-hopper) is configured to receive agricultural product (e.g., continuously, periodically, on-demand, etc.) from a central storage compartment of the agricultural implement during the planting operation. The agricultural product meter is configured to control a flow rate of the agricultural product (e.g., seed, fertilizer, other agricultural product, etc.) to the agricultural product conveying system, thereby controlling the flow rate of the agricultural product into the trench. As a result, a desired distribution to the agricultural product throughout the field (e.g., a desired seed spacing along a respective seed row) may be established.

In certain embodiments, at least one row unit 12 of the agricultural implement 10 includes a mounting assembly configured to selectively couple the agricultural product meter to the storage compartment. The mounting assembly may include an upper mount coupled to the storage compartment and configured to support at least a portion of a weight of the agricultural product meter. The mounting assembly may also include a pin configured to engage the agricultural product meter via movement of the pin along a longitudinal axis of the pin. In addition, the mounting assembly may include a lower mount coupled to the storage compartment, in which the lower mount is configured to selectively receive the pin via movement of the pin along the longitudinal axis of the pin. The pin is configured to block movement of the agricultural product meter away from the storage compartment while the pin is engaged with the agricultural product meter and the lower mount. Due to the stiffness of the upper mount, deflection of the upper mount during a high g-force event (e.g., a wheel of the planting implement engaging a recess within a road while the planting implement is being transported) may be substantially reduced (e.g., as compared to an upper mount having a clip configured to deflect in response to contact with an extension of the agricultural product meter to facilitate engagement of the extension with the clip during coupling of the agricultural product meter to the storage compartment). As a result, movement (e.g., rotation) of the agricultural product meter relative to the storage compartment during a high g-force event may be substantially reduced, thereby substantially reducing or eliminating the possibility of misalignment between the agricultural product meter and the storage compartment.

Figure 2:
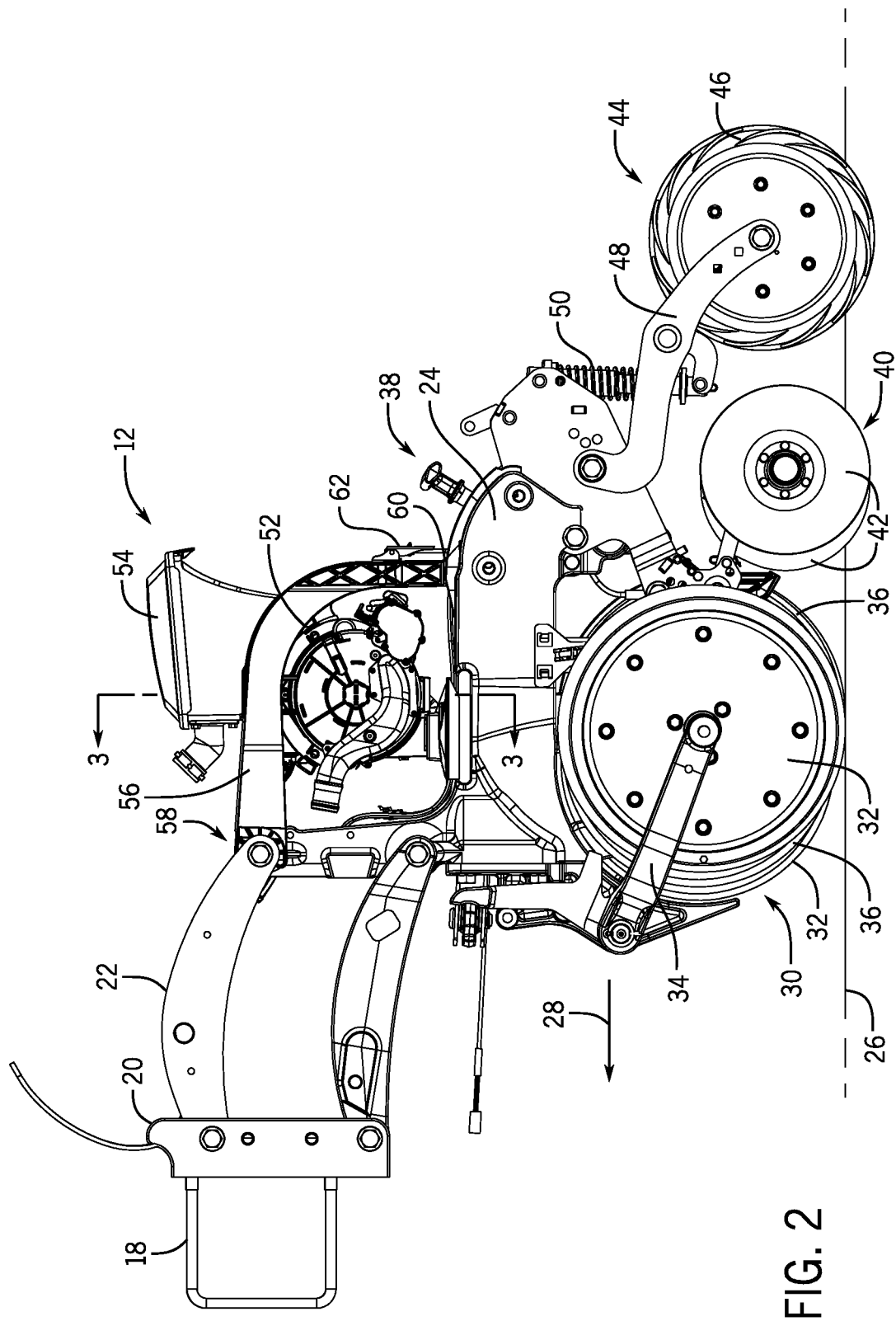
FIG. 2 is a side view of an embodiment of a row unit that may be employed on the agricultural implement of FIG. 1.

FIG. 2 is a side view of an embodiment of a row unit 12 (e.g., agricultural row unit) that may be employed on the agricultural implement of FIG. 1. The row unit 12 includes a mount 18 configured to secure the row unit 12 to the tool bar of the agricultural implement. In the illustrated embodiment, the mount 18 includes a u-bolt that secures a bracket 20 of the row unit 12 to the tool bar. However, in alternative embodiments, the mount may include another suitable device that couples the row unit to the tool bar. A linkage assembly 22 extends from the bracket 20 to a frame 24 of the row unit 12. The linkage assembly 22 is configured to enable vertical movement of the frame 24 relative to the tool bar in response to variations in a soil surface 26. In certain embodiments, a down pressure system (e.g., including a hydraulic actuator, a pneumatic actuator, etc.) may be coupled to the linkage assembly 22 and configured to urge the frame 24 toward the soil surface 26. While the illustrated linkage assembly 22 is a parallel linkage assembly (e.g., a four-bar linkage assembly), in alternative embodiments, another suitable linkage assembly may extend between the bracket and the frame.

The row unit 12 is configured to deposit seeds and/or other agricultural product(s) at a desired depth beneath the soil surface 26 as the row unit 12 traverses a field along a direction of travel 28. The row unit 12 includes an opener assembly 30 that forms a trench in the soil for seed/other agricultural product deposition into the soil. In the illustrated embodiment, the opener assembly 30 includes gauge wheels 32, arms 34 that pivotally couple the gauge wheels 32 to the frame 24, and opener discs 36. The opener discs 36 are configured to excavate a trench into the soil, and the gauge wheels 32 are configured to control a penetration depth of the opener discs 36 into the soil. In the illustrated embodiment, the row unit 12 includes a depth control system 38 configured to control the vertical position of the gauge wheels 32 (e.g., by blocking rotation of the arms in the upward direction beyond a selected orientation), thereby controlling the penetration depth of the opener discs 36 into the soil. While the opener assembly 30 includes opener discs 36 in the illustrated embodiment, in other embodiments, the opener assembly may include any other suitable opener(s) (e.g., knife blade opener(s), coulter(s), etc.) configured to form the trench in the soil.

The row unit 12 also includes an agricultural product conveying system (e.g., seed tube or powered agricultural product conveyor) configured to deposit seeds and/or other agricultural product(s) (e.g., fertilizer) into the trench. The opener assembly 30 and the agricultural product conveying system are followed by a closing assembly 40 that moves displaced soil back into the trench. In the illustrated embodiment, the closing assembly 40 includes two closing discs 42. However, in alternative embodiments, the closing assembly may include other closing devices (e.g., a single closing disc, etc.). In addition, in certain embodiments, the closing assembly may be omitted. In the illustrated embodiment, the closing assembly 40 is followed by a packing assembly 44 configured to pack soil on top of the deposited seeds and/or other agricultural product(s). The packing assembly 44 includes a packer wheel 46, an arm 48 that pivotally couples the packer wheel 46 to the frame 24, and a biasing member 50 configured to urge the packer wheel 46 toward the soil surface 26, thereby enabling the packer wheel to pack soil on top of the deposited seeds and/or other agricultural product (s). While the illustrated biasing member 50 includes a spring, in alternative embodiments, the biasing member may include another suitable biasing device, such as a hydraulic cylinder or a pneumatic cylinder, among others. Furthermore, in certain embodiments, the packing assembly may be omitted.

The row unit 12 includes an agricultural product meter 52 configured to receive agricultural product (e.g., seeds) from a storage compartment 54. In the illustrated embodiment, the storage compartment 54 includes a mini-hopper configured to receive agricultural product (e.g., continuously, periodically, on-demand, etc.) from a central storage compartment of the agricultural implement during planting operations. However, in other embodiments, the storage compartment may include a hopper configured to store a sufficient amount of agricultural product to complete a desired planting operation, or any other suitable container or combination of containers. Furthermore, in the illustrated embodiment, the agricultural product meter 52 includes a vacuum seed meter, which includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the agricultural product meter includes a vacuum seed meter in the illustrated embodiment, in other embodiments, other suitable seed/agricultural product meters may be utilized. As used herein, "vacuum" refers to an air pressure that is less than the ambient atmospheric air pressure, and not necessarily 0 pa.

The agricultural product meter 52 is coupled to the storage compartment 54, and the storage compartment 54 is coupled to the frame 24 of the row unit 12. In the illustrated embodiment, the storage compartment 54 includes a mounting portion 56 configured to couple the storage compartment 54 to the row unit frame 24. The mounting portion 56 has recesses 58 configured to engage a rod/pin that is coupled to the row unit frame 24. To couple the storage compartment 54 to the row unit frame 24, the recesses 58 may be engaged with the rod/pin, and the storage compartment 54 may be rotated downwardly, such that an end 60 of the mounting portion 56 engages the row unit frame 24. A latch 62, which is coupled to the mounting portion 56, may then be engaged to couple the storage compartment 54 to the row unit frame 24. While the storage compartment 54 is coupled to the row unit frame 24 via the recesses 58 and the latch 62 in the illustrated embodiment, in other embodiments, the storage compartment may be coupled to the row unit frame by any other suitable mounting system(s) (e.g., fastener(s), multiple latches, an adhesive connection, a welded connection, other suitable mounting system(s), or a combination thereof).

Prior to coupling the storage compartment 54 to the row unit frame 24, the agricultural product meter 52 may be coupled to the storage compartment 54. As discussed in detail below, a mounting assembly may couple the agricultural product meter 52 to the storage compartment 54. In certain embodiments, the mounting assembly includes an upper mount coupled to the storage compartment 54 and configured to support at least a portion of a weight of the agricultural product meter 52. In addition, the mounting assembly includes a pin configured to engage the agricultural product meter via movement of the pin along a longitudinal axis of the pin. The mounting assembly also includes a lower mount coupled to the storage compartment 54 and configured to selectively receive the pin via movement of the pin along the longitudinal axis of the pin. The pin is configured to block movement of the agricultural product meter 52 away from the storage compartment 54 while the pin is engaged with the agricultural product meter 52 and the lower mount. Because the upper mount is not configured to deflect to facilitate engagement of an extension of the agricultural product meter with the upper mount during coupling of the agricultural product meter to the storage compartment, the upper mount may be formed less precisely than an upper mount having a clip configured to deflect in response to contact with the extension of the agricultural product meter to facilitate engagement of the extension with the clip during coupling of the agricultural product meter to the storage compartment. In addition, the use of a second clip configured to couple the extension to the first clip may be obviated. As a result, the manufacturing cost of the upper mount may be substantially reduced. While the agricultural product meter 52 is coupled to the storage compartment 54 prior to coupling the storage compartment 54 to the row unit frame 24 in the illustrated embodiment, in other embodiments, the storage compartment may be coupled to the row unit frame prior to coupling the agricultural product meter to the storage compartment.

FIG. 3 is a cross-sectional view of the agricultural product meter 52 and the storage compartment 54 of the row unit of FIG. 2, taken along line 3-3 of FIG. 2, in which the agricultural product meter 52 is coupled to the storage compartment 54 via an embodiment of a mounting assembly 64. In the illustrated embodiment, the mounting assembly 64 has an upper mount 66 and a lower mount 68. The upper mount 66 is configured to support at least a portion of a weight of the agricultural product meter 52. In addition, the upper mount 66 is coupled to the storage compartment 54 (e.g., support structure). In the illustrated embodiment, the upper mount 66 is coupled to the storage compartment 54 by fastener(s) 70. However, in other embodiments, the upper mount may be coupled to the storage compartment by any other suitable mounting system(s) (e.g., alone or in combination with the fastener(s)), such as an adhesive connection, a welded connection, another suitable connection, or a combination thereof. Furthermore, in certain embodiments, the upper mount may be integrally formed with the storage compartment, such that the upper mount is coupled to the storage compartment by an integral connection.

In the illustrated embodiment, the upper mount 66 is formed from a single piece of resilient metal 72 (e.g., spring steel, stainless steel, aluminum, etc.). The upper mount 66 is configured to urge the agricultural product meter 52 upwardly. Accordingly, the resilient metal 72 may have a thickness sufficient to support the weight of the agricultural product meter 52 and to urge the agricultural product meter 52 upwardly while the agricultural product meter 52 is coupled to the storage compartment 54. Furthermore, in the illustrated embodiment, the upper mount 66 has a recess 74 configured to receive an extension 76 of the agricultural product meter 52 to block movement of the agricultural product meter 52 (e.g., an upper portion 78 of the agricultural product meter 52) away from the upper mount 66/storage compartment 54. While the upper mount is formed from a single piece of resilient metal in the illustrated embodiment, in other embodiments, the upper mount may be formed from multiple elements (e.g., 2, 3, 4, 5, or more), and/or the upper mount may be formed from other suitable material(s) (e.g., polymeric material(s), composite material(s), etc.). For example, in certain embodiments, the upper mount may include a first portion formed from a composite material (e.g., fiberglass, carbon fiber, etc.) and a second portion (e.g., including the recess) formed from metal (e.g., spring steel).

In addition, the mounting assembly 64 includes a pin 80 configured to engage the agricultural product meter 52 via movement of the pin 80 along a longitudinal axis of the pin. The lower mount 68 is configured to selectively receive the pin 80 via movement of the pin along the longitudinal axis of the pin. The lower mount 68 is also coupled to the storage compartment 54, as discussed in detail below. The pin 80 is configured to block movement of the agricultural product meter 52 (e.g., a lower portion 82 of the agricultural product meter 52) away from the storage compartment 54 while the pin 80 is engaged with the agricultural product meter 52 and the lower mount 68. In certain embodiments, the pin has an engagement portion extending substantially perpendicularly to the longitudinal axis of the pin. In such embodiments, the lower mount has a recess configured to receive the engagement portion of the pin via rotation of the pin about the longitudinal axis of the pin while the pin is engaged with the agricultural product meter and the lower mount. Furthermore, in certain embodiments, the lower mount may include a latch configured to block rotation of the pin while the engagement portion of the pin is engaged with the recess of the lower mount.

To couple the agricultural product meter 52 to the storage compartment 54, the extension 76 of the agricultural product meter 52 is engaged with the recess 74 of the upper mount 66. The agricultural product meter 52 is then rotated about a pivot joint formed at an intersection between the extension 76 of the agricultural product meter 52 and the upper mount 66, such that a protrusion 84 of the agricultural product meter 52 engages an opening in the lower mount 68. In certain embodiments, the agricultural product meter 52 may be moved downwardly (e.g., against the upward bias provided by the upper mount 66) as/before/after the agricultural product meter 52 is rotated to facilitate engagement of the protrusion 84 with the opening in the lower mount 68. The pin 80 may then be moved along the longitudinal axis of the pin such that the pin engages the protrusion 84 of the agricultural product meter 52 and the lower mount 68. Furthermore, in certain embodiments, the pin may be rotated about the longitudinal axis of the pin while the pin is engaged with the protrusion of the agricultural product meter and the lower mount, such that the engagement portion of the pin engages the recess in the lower mount. As previously discussed, the latch of the lower mount may block rotation of the pin while the engagement portion of the pin is engaged with the recess.

With the extension 76 of the agricultural product meter 52 engaged with the recess 74 of the upper mount 66 and the pin 80 engaged with the agricultural product meter 52 and the lower mount 68, movement of the agricultural product meter 52 away from the storage compartment 54 is blocked via contact between the extension 76 and the upper mount 66 and contact between the pin 80 and the agricultural product meter 52 and the lower mount 68. In addition, movement of the agricultural product meter 52 toward the storage compartment 54 is blocked by contact between the agricultural product meter 52 and the storage compartment 54 (e.g., contact between an outer surface 86 of the agricultural product meter 52 and an outer surface 88 of the storage compartment 54). Furthermore, movement of the agricultural product meter 52 in a downward direction 90 is blocked by engagement of the pin 80 with the agricultural product meter 52 and the lower mount 68, and by contact between the extension 76 of the agricultural product meter 52 and the upper mount 66. Movement of the agricultural product meter 52 in an upward direction 92 is blocked by contact between the agricultural product meter 52 and the storage compartment 54. In addition, rotation of the agricultural product meter 52 about the pin 80 away from the storage compartment 54 is blocked by contact between the extension 76 and the upper mount 66. Due to the stiffness of the upper mount 66 (e.g., the resilient metal 72 of the upper mount 66), deflection of the upper mount 66 during a high g-force event (e.g., a wheel of the planting implement engaging a recess within a road while the planting implement is being transported) may be substantially reduced (e.g., as compared to an upper mount having a clip configured to deflect in response to contact with the extension to facilitate engagement of the extension with the clip during coupling of the agricultural product meter to the storage compartment). As a result, movement (e.g., rotation) of the agricultural product meter relative to the storage compartment during a high g-force event (e.g., up to 5 g's) may be substantially reduced, thereby substantially reducing or eliminating the possibility of misalignment between the agricultural product meter and the storage compartment.

While the agricultural product meter 52 is coupled to the storage compartment 54 using the mounting assembly 64 in the illustrated embodiment, in other embodiments, the agricultural product meter may be coupled to any other suitable structure of the row unit (e.g., the frame, etc.) using the mounting assembly disclosed herein. Furthermore, while the upper mount is configured to urge the agricultural product meter upwardly in the illustrated embodiment, in other embodiments, other suitable component(s) may be configured to urge the agricultural product meter upwardly (e.g., alone or in combination with the upper mount). For example, in certain embodiments, the pin may be configured to urge the agricultural product meter upwardly (e.g., due to interference between the pin and the agricultural product meter/lower mount). In such embodiments, the pin may be curved/bowed to establish the interference and/or the agricultural product meter/lower mount may be shaped to establish the interference.

Figure 4:
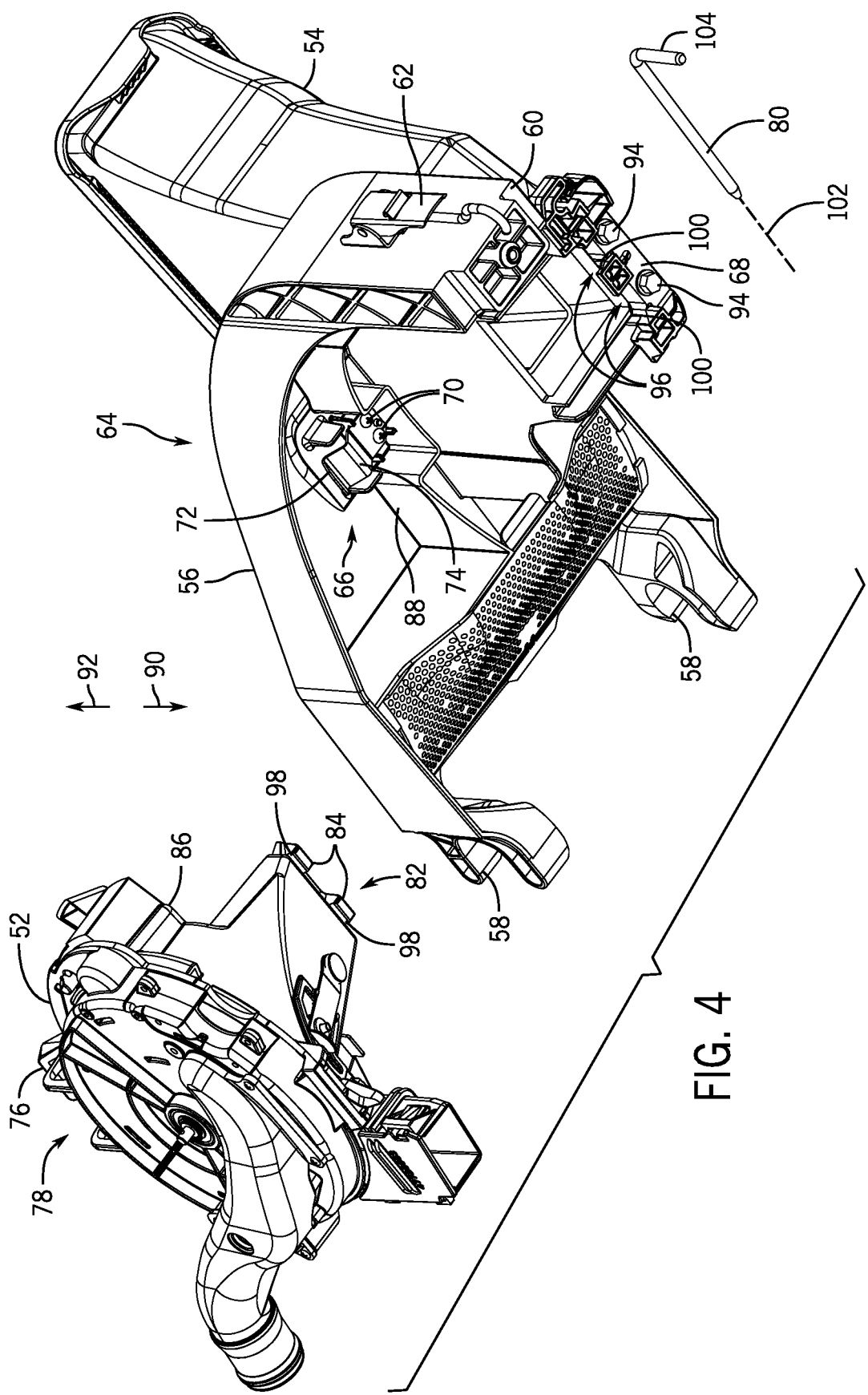
FIG. 4 is an exploded perspective view of the agricultural product meter, the storage compartment, and the mounting assembly of FIG. 3.

FIG. 4 is an exploded perspective view of the agricultural product meter 52, the storage compartment 54, and the mounting assembly 64 of FIG. 3. As previously discussed, the upper mount 66 is coupled to the storage compartment 54 by fastener(s) 70. In the illustrated embodiment, two fasteners 70 are used to couple the upper mount 66 to the storage compartment 54. However, in other embodiments, the upper mount may be coupled to the storage compartment by more or fewer fasteners (e.g., 0, 1, 2, 3, 4, 5, 6, or more). Furthermore, in certain embodiments, the upper mount may be coupled to the storage compartment by any other suitable mounting system(s) (e.g., alone or in combination with the fastener(s)), such as adhesive connection(s), welded connection(s), other suitable connection(s), or a combination thereof. Furthermore, in certain embodiments, the upper mount may be integrally formed with the storage compartment, such that the upper mount is coupled to the storage compartment by an integral connection.

In the illustrated embodiment, the lower mount 68 is coupled to the storage compartment 54 by fasteners 94. While two fasteners 94 are used to couple the lower mount 68 to the storage compartment 54 in the illustrated embodiment, in other embodiments, the lower mount may be coupled to the storage compartment by more or fewer fasteners (e.g., 0, 1, 2, 3, 4, 5, 6, or more). Furthermore, in certain embodiments, the lower mount may be coupled to the storage compartment by any other suitable mounting system(s) (e.g., alone or in combination with the fastener (s)), such as adhesive connection(s), welded connection(s), other suitable connection(s), or a combination thereof. Furthermore, in certain embodiments, the lower mount may be integrally formed with the storage compartment, such that the lower mount is coupled to the storage compartment by an integral connection.

In certain embodiments, the mounting assembly 64 disclosed herein may be utilized with an agricultural product meter and a storage compartment configured to couple to one another via another mounting assembly. For example, the other mounting assembly may include an upper mount and a lower mount, in which each mount is coupled to the storage compartment by fastener(s). The other mounting assembly may be removed and replaced with the mounting assembly 64 disclosed herein to enhance the coupling between the agricultural product meter and the storage compartment (e.g., during a high g-force event). For example, the fasteners coupling the upper and lower mounts of the other mounting assembly may be removed to facilitate removal of the other mounting assembly, and the upper mount 66 and the lower mount 68 of the illustrated mounting assembly 64 may be coupled to the storage compartment 54 via the respective fasteners (e.g., which may be the same or different from the fasteners used to couple the mounts of the other mounting assembly to the storage compartment). In certain embodiments, the mounting assembly 64 disclosed herein may be sold as a kit, including the upper mount 66, the lower mount 68, and the pin 80 (e.g., and the upper mount fastener(s) 70 and/or the lower mount fastener(s) 94).

As previously discussed, to couple the agricultural product meter 52 to the storage compartment 54, the extension 76 of the agricultural product meter 52 is engaged with the recess 74 of the upper mount 66. The agricultural product meter 52 is then rotated about a pivot joint formed at an intersection between the extension 76 of the agricultural product meter 52 and the upper mount 66, such that the protrusion(s) 84 of the agricultural product meter 52 engage the respective opening(s) 96 in the lower mount 68. In the illustrated embodiment, the agricultural product meter 52 includes two protrusions 84, and the lower mount 68 has two respective openings 96. However, in other embodiments, the agricultural product meter may include more or fewer protrusions (e.g., 0, 1, 2, 3, 4, 5, 6, or more), and the lower mount may have a corresponding number of openings. Additionally or alternatively, the lower mount may include one or more protrusions, and the agricultural product meter may have one or more openings configured to receive the protrusion(s) of the lower mount.

The agricultural product meter 52 includes one or more recesses 98 configured to selectively receive the pin 80. In the illustrated embodiment, each protrusion 84 includes a respective recess 98, and each recess 98 is configured to selectively receive the pin 80 while the protrusions 84 are disposed within the respective openings 96 in the lower mount 68. While the recess(es) 98 are formed within the protrusions 84 of the agricultural product meter 52 in the illustrated embodiment, in other embodiments, at least one recess may be formed within any other suitable portion of the agricultural product meter. Furthermore, the lower mount 68 includes one or more recesses 100 configured to selectively receive the pin 80 (e.g., while the protrusions 84 of the agricultural product meter 52 are disposed within the respective openings 96 in the lower mount 68). The recess (es) of the agricultural product meter and the recess(es) of the lower mount align with one another while the agricultural product meter is engaged with the storage compartment (e.g., while the protrusions of the agricultural product meter are disposed within the respective openings in the lower mount) to facilitate engagement of the pin with the recesses. While the recess(es) 98 of the agricultural product meter 52 and the recess(es) 100 of the lower mount 68 are open recesses in the illustrated embodiment, in other embodiment, at least one recess (e.g., of the agricultural product meter and/or of the lower mount) may be a closed recess (e.g., an aperture).

Once the recesses of the agricultural product meter and the lower mount are aligned with one another, the pin 80 may be moved along a longitudinal axis 102 of the pin 80 such that the pin engages the recess(es) 98 of the protrusion (s) 84 of the agricultural product meter 52 and the recess(es) 100 of the lower mount 68. As previously discussed, movement of the agricultural product meter 52 away from the storage compartment 54 and movement of the agricultural product meter 52 in the downward direction 90 are blocked by contact between the pin 80 and the agricultural product meter 52 and the lower mount 68. Furthermore, in certain embodiments, the pin 80 may be rotated about the longitudinal axis 102 of the pin 80 while the pin 80 is engaged with the agricultural product meter 52 and the lower mount 68, such that an engagement portion 104 of the pin 80 engages an additional recess in the lower mount 68. As illustrated, the engagement portion 104 extends substantially perpendicularly to the longitudinal axis 102 of the pin 80. As discussed in detail below, a latch of the lower mount may block rotation of the pin while the engagement portion of the pin is engaged with the additional recess. Accordingly, removal of the pin from the agricultural product meter/lower mount may be substantially blocked.

Figure 5:
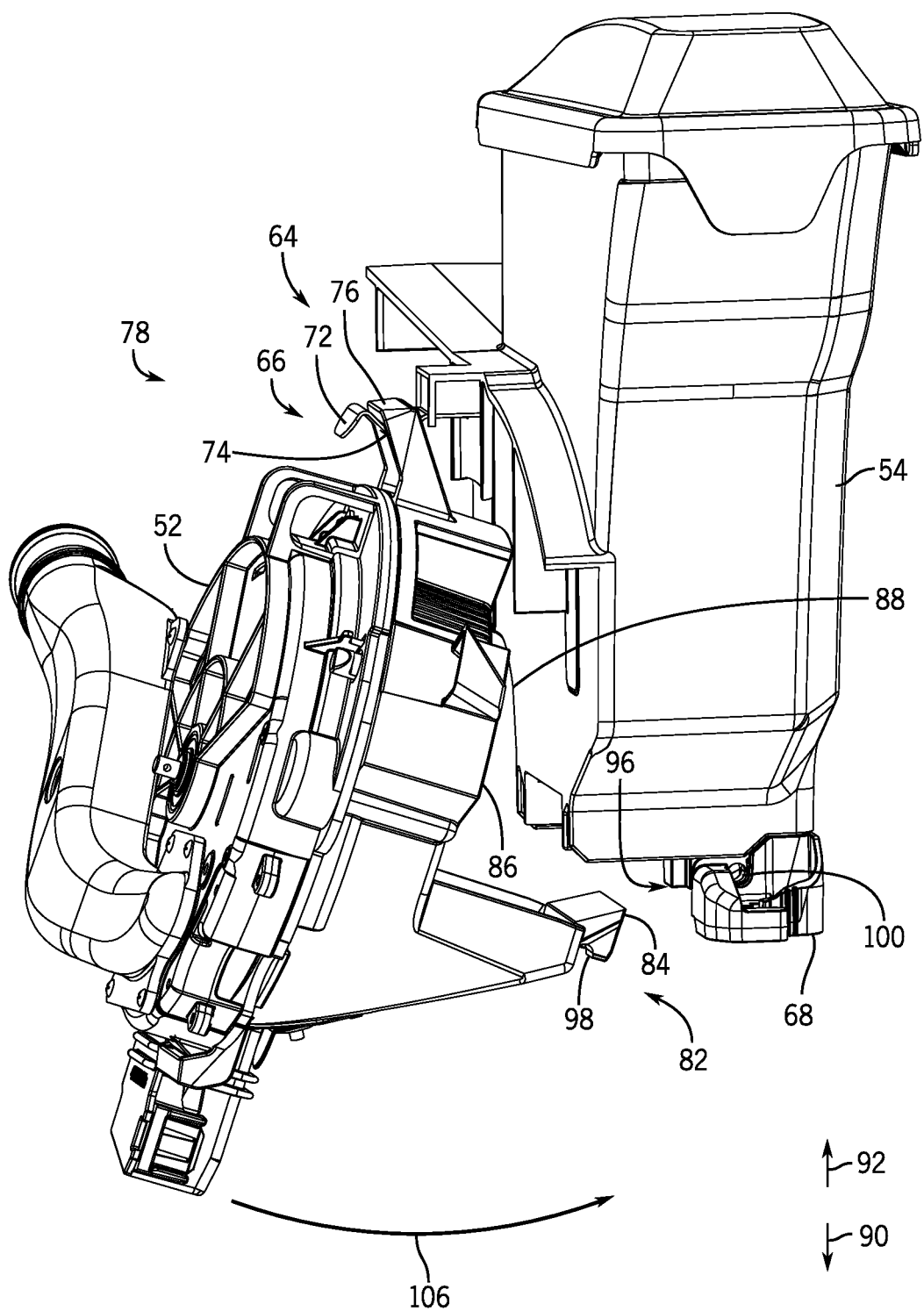
FIG. 5 is a perspective view of the agricultural product meter, a portion of the storage compartment, and a portion of the mounting assembly of FIG. 3, in which the agricultural product meter is partially coupled to the storage compartment via the mounting assembly.

FIG. 5 is a perspective view of the agricultural product meter 52, a portion of the storage compartment 54, and a portion of the mounting assembly 64 of FIG. 3, in which the agricultural product meter 52 is partially coupled to the storage compartment 54 via the mounting assembly 64. As illustrated, the extension 76 of the agricultural product meter 52 is engaged with the recess 74 of the upper mount 66, thereby establishing a pivot joint. Once the extension 76 is engaged with the recess 74 of the upper mount 66, the agricultural product meter 52 may be rotated about the pivot joint in a direction 106 toward the storage compartment 54 until the protrusion(s) 84 of the agricultural product meter 52 engage the respective opening(s) 96 of the lower mount 68 (e.g., until the outer surface 86 of the agricultural product meter 52 contacts the outer surface 88 of the storage compartment 54). In certain embodiments, the agricultural product meter 52 may be moved in the downward direction 90 (e.g., against the upward bias provided by the upper mount 66) as/before/after the agricultural product meter 52 is rotated to facilitate engagement of the protrusion(s) 84 with the respective opening(s) 96 of the lower mount 68. As previously discussed, once the recess(es) 98 of the agricultural product meter 52 are aligned with the recess(es) 100 of the lower mount 68, the pin may be moved along the longitudinal axis of the pin such that the pin engages the recesses of the agricultural product meter 52 and the lower mount 68.

FIG. 6 is a perspective view of the agricultural product meter 52, the storage compartment 54, and the mounting assembly 64 of FIG. 3, in which the agricultural product meter 52 is partially coupled to the storage compartment 54 via the mounting assembly 64. The protrusion(s) of the agricultural product meter 52 are engaged with the opening(s) of the lower mount 68. In addition, the recess(es) of the agricultural product meter 52 are aligned with the recess(es) of the lower mount 68. The pin 80 may be moved along the longitudinal axis 102 of the pin 80 in a direction 108 such that the pin 80 engages the recesses of the agricultural product meter 52 and the lower mount 68. As previously discussed, movement of the agricultural product meter 52 away from the storage compartment 54 and movement of the agricultural product meter 52 in the downward direction 90 are blocked by contact between the pin 80 and the agricultural product meter 52 and the lower mount 68.

FIG. 7 is a perspective view of a portion of the agricultural product meter 52, a portion of the storage compartment 54, and a portion of the mounting assembly 64 of FIG. 3, in which the pin 80 of the mounting assembly 64 is in an unlocked position. The pin 80 is engaged with the recesses of the agricultural product meter 52 and the lower mount 68. Accordingly, movement of the agricultural product meter 52 away from the storage compartment 54 and movement of the agricultural product meter 52 in the downward direction 90 are blocked. In the illustrated embodiment, the lower mount 68 has an additional recess 110 configured to receive the engagement portion 104 of the pin 80 via rotation of the pin 80 about the longitudinal axis 102 of the pin 80 while the pin 80 is engaged with the agricultural product meter 52 and the lower mount 68. For example, with the pin 80 engaged with the agricultural product meter 52 and the lower mount 68, as illustrated, the pin 80 may be rotated in a rotational direction 112, such that the engagement portion 104 of the pin 80 engages the additional recess 110. While the engagement portion 104 of the pin 80 is engaged with the additional recess 110, movement of the pin 80 along the longitudinal axis 102 of the pin 80 is blocked by contact between the engagement portion 104 of the pin 80 and the lower mount 68, thereby blocking removal of the pin from the agricultural product meter/lower mount.

In the illustrated embodiment, the lower mount 68 includes a latch 114 configured to block rotation of the pin 80 while the engagement portion 104 of the pin 80 is engaged with the additional recess 110. In certain embodiments, the latch 114 is biased toward a first position, and the latch 114 is configured to block rotation of the pin 80 while the engagement portion 104 of the pin 80 is engaged with the additional recess 110 and the latch 114 is in the first position. In addition, the latch 114 is movable to a second position that enables the engagement portion 104 of the pin 80 to engage/disengage the additional recess 110 via rotation of the pin 80 about the longitudinal axis 102 of the pin 80. For example, as the pin 80 is rotated from the illustrated unlocked position toward a locked position, as shown in FIG. 8, in the rotational direction 112 about the longitudinal axis 102 of the pin 80, the engagement portion 104 of the pin 80 contacts the latch 114, thereby driving the latch 114 in a translational direction 116 from the illustrated first position to the second position. As a result, rotation of the pin 80 in the rotational direction 112 to the locked position, in which the engagement portion 104 of the pin 80 is engaged with the additional recess 110 of the lower mount 68, is enabled. With the engagement portion 104 of the pin 80 engaged with the additional recess 110 of the lower mount 68, the latch 114 moves back to the illustrated first position, thereby blocking rotation of pin 80 to the unlocked position.

While the latch is biased toward the first position and configured to be driven to the second position by rotation of the pin in the illustrated embodiment, in other embodiments, the latch may be manually moved between the first position and the second position. Furthermore, in certain embodiments, the latch may be omitted, and/or the pin may be secured in the locked position by one or more other suitable devices/assemblies, such as cotter pin(s), magnetic coupling(s), one or more other suitable devices/assemblies, or a combination thereof. In addition, in certain embodiments, the engagement portion of the pin, the additional recess in the lower mount, and the latch may be omitted. In such embodiments, one or more other suitable devices/assemblies may be used to selectively block movement of the pin along the longitudinal axis of the pin, such as cotter pin(s), magnetic coupling(s), one or more other suitable devices/assemblies, or a combination thereof.

FIG. 8 is a perspective view of a portion of the agricultural product meter 52, a portion of the storage compartment 54, and a portion of the mounting assembly 64 of FIG. 3, in which the pin 80 is in the locked position. As illustrated, with the pin 80 in the illustrated locked position, the extension portion 104 of the pin 80 is engaged with the additional recess 110 of the lower mount 68, and the latch 114, which is in the first position, blocks rotation of the pin 80 toward the unlocked position. To remove the pin 80 from the agricultural product meter/lower mount, the latch 114 may be moved in the translational direction 116 to the second position, and the pin 80 may be rotated to the unlocked position. The pin 80 may then be removed via movement of the pin along the longitudinal axis 102 of the pin 80, thereby facilitating removable of the agricultural product meter from the storage compartment.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mounting assembly for an agricultural product meter, comprising:

an upper mount configured to support at least a portion of a weight of the agricultural product meter, wherein the upper mount is configured to couple to a support structure;

a pin configured to engage the agricultural product meter via movement of the pin along a longitudinal axis of the pin; and a lower mount configured to selectively receive the pin via movement of the pin along the longitudinal axis of the pin, wherein the lower mount is configured to couple to the support structure, and the pin is configured to block movement of the agricultural product meter away from the support structure while the pin is engaged with the agricultural product meter and the lower mounts;

wherein the pin has an engagement portion extending substantially perpendicularly to the longitudinal axis of the pin, the lower mount has a recess configured to receive the engagement portion of the pin via rotation of the pin about the longitudinal axis of the pin while the pin is engaged with the agricultural product meter and the lower mount, and the lower mount comprises a latch configured to block rotation of the pin while the engagement portion of the pin is engaged with the recess.

2. The mounting assembly of claim 1, wherein the latch is biased toward a first position, the latch is configured to block rotation of the pin while the engagement portion of the pin is engaged with the recess and the latch is in the first position, and the latch is movable to a second position that enables the engagement portion of the pin to disengage the recess via rotation of the pin about the longitudinal axis of the pin.

3. The mounting assembly of claim 1, wherein the lower mount has a recess configured to selectively receive the pin.

4. The mounting assembly of claim 1, comprising a fastener configured to couple the lower mount to the support structure.

5. The mounting assembly of claim 1, wherein the upper mount has a recess configured to receive an extension of the agricultural product meter to block movement of the agricultural product meter away from the upper mount.

6. The mounting assembly of claim 1, comprising a fastener configured to couple the upper mount to the support structure.

7. The mounting assembly of claim 1, wherein the upper mount is configured to urge the agricultural product meter upwardly while the pin is engaged with the agricultural product meter and the lower mount.

8. A row unit of an agricultural implement, comprising:
an agricultural product meter;
a storage compartment; and
a mounting assembly configured to selectively couple the agricultural product meter to the storage compartment, wherein the mounting assembly comprises:
an upper mount coupled to the storage compartment, wherein the upper mount is configured to support at least a portion of a weight of the agricultural product meter;
a pin configured to engage the agricultural product meter via movement of the pin along a longitudinal axis of the pin; and
a lower mount coupled to the storage compartment, wherein the lower mount is configured to selectively receive the pin via movement of the pin along the longitudinal axis of the pin, and the pin is configured to block movement of the agricultural product meter away from the storage compartment while the pin is engaged with the agricultural product meter and the lower mount.

9. The row unit of claim 8, wherein the pin has an engagement portion extending substantially perpendicularly to the longitudinal axis of the pin, the lower mount comprises a recess configured to receive the engagement portion of the pin via rotation of the pin about the longitudinal axis of the pin while the pin is engaged with the agricultural product meter and the lower mount, and the lower mount comprises a latch configured to block rotation of the pin while the engagement portion of the pin is engaged with the recess.

10. The row unit of claim 9, wherein the latch is biased toward a first position, the latch is configured to block rotation of the pin while the engagement portion of the pin is engaged with the recess and the latch is in the first position, and the latch is movable to a second position that enables the engagement portion of the pin to disengage the recess via rotation of the pin about the longitudinal axis of the pin.

11. The row unit of claim 8, wherein the upper mount has a recess configured to receive an extension of the agricultural product meter to block movement of the agricultural product meter away from the upper mount.

12. The row unit of claim 8, wherein the upper mount is configured to urge the agricultural product meter upwardly while the pin is engaged with the agricultural product meter and the lower mount.

13. The row unit of claim 8, wherein the mounting assembly comprises a first fastener configured to couple the upper mount to the storage compartment, a second fastener configured to couple the lower mount to the storage compartment, or a combination thereof.

14. A method of coupling an agricultural product meter to a support structure, comprising:
engaging an extension of the agricultural product meter with an upper mount of a mounting assembly, wherein the upper mount is coupled to the support structure, the extension is positioned at an upper portion of the agricultural product meter, and the upper mount is configured to support at least a portion of a weight of the agricultural product meter;
moving the agricultural product meter downwardly against an upward bias provided by the upper mount after engaging the extension of the agricultural product meter with the upper mount;
rotating the agricultural product meter about a pivot joint formed at an intersection between the extension of the agricultural product meter and the upper mount of the mounting assembly such that the agricultural product meter engages a lower mount of the mounting assembly, wherein the lower mount is coupled to the support structure; and
moving a pin of the mounting assembly along a longitudinal axis of the pin such that the pin engages the agricultural product meter and the lower mount, wherein the pin is configured to block movement of the agricultural product meter away from the support structure while the pin is engaged with the agricultural product meter and the lower mount of the mounting assembly;
wherein the upper mount is configured to urge the agricultural product meter upwardly while the pin is engaged with the agricultural product meter and the lower mount.

15. The method of claim 14, comprising rotating the pin about the longitudinal axis of the pin while the pin is engaged with the agricultural product meter and the lower mount, such that an engagement portion of the pin engages a recess in the lower mount, wherein the engagement portion of the pin extends substantially perpendicularly to the longitudinal axis of the pin, and the lower mount comprises a latch configured to block rotation of the pin while the engagement portion of the pin is engaged with the recess.

16. The method of claim 15, wherein the latch is biased toward a first position, the latch is configured to block rotation of the pin while the engagement portion of the pin is engaged with the recess and the latch is in the first position, and the latch is movable to a second position that enables the engagement portion of the pin to disengage the recess via rotation of the pin about the longitudinal axis of the pin.

17. The method of claim 14, comprising coupling the upper mount to the support structure via a fastener before engaging the extension of the agricultural product meter with the upper mount of the mounting assembly.

18. The method of claim 14, comprising coupling the lower mount to the support structure via a fastener before engaging the agricultural product meter with the lower mount of the mounting assembly.

\* \* \* \* \*